United States Patent
Su et al.

(10) Patent No.: US 6,693,753 B2
(45) Date of Patent: Feb. 17, 2004

(54) DISC SEQUENCER SUPPORTING PIPELINED AND NON-PIPELINED READ

(75) Inventors: Hui Su, Longmont, CO (US); Gregory P. Moller, Longmont, CO (US)

(73) Assignee: Seagate Technology LLC, Scotts Valley, CA (US)

(*) Notice: Subject to any disclaimer, the term of this patent is extended or adjusted under 35 U.S.C. 154(b) by 131 days.

(21) Appl. No.: 09/872,409

(22) Filed: Jun. 1, 2001

(65) Prior Publication Data

US 2002/0024754 A1 Feb. 28, 2002

Related U.S. Application Data

(60) Provisional application No. 60/209,280, filed on Jun. 2, 2000.

(51) Int. Cl.[7] .................................................. G11B 5/09
(52) U.S. Cl. ........................................................ 360/51
(58) Field of Search ........................... 360/51, 77.08, 360/78.14; 710/52, 72, 73, 74; 711/111, 4, 113

(56) References Cited

U.S. PATENT DOCUMENTS

| | | | |
|---|---|---|---|
| 5,274,773 A | 12/1993 | Squires et al. | |
| 5,276,662 A | 1/1994 | Shaver, Jr. et al. | |
| 5,289,584 A * | 2/1994 | Thome et al. | 711/109 |
| 5,875,349 A | 2/1999 | Cornaby et al. | |
| 6,000,018 A * | 12/1999 | Packer et al. | 711/154 |
| 6,061,751 A | 5/2000 | Brune et al. | |
| 6,154,331 A | 11/2000 | Hanna | |
| 6,487,029 B1 * | 11/2002 | Wu | 360/27 |

* cited by examiner

Primary Examiner—Alan T Faber
(74) Attorney, Agent, or Firm—Merchant & Gould P.C.

(57) ABSTRACT

A disc sequencer incorporating parallel state machines to support both pipelined and non-pipelined read modes is disclosed. The parallel state machines include a first state machine and a second state machine for controlling whether data are read from a disc media and transferred to a buffer via a channel interface coupled to a read/write channel. Data may be read through the read/write channel in either pipelined or non-pipelined mode. If an operational state of either state machine is active, then the transfer of data between a read/write head accessing the media and the buffer is enabled. The operational state of the first state machine is dependent on the operational state of the second state machine such that if the second state machine is active, the operational state of the first machine will go active on the following clock period.

20 Claims, 5 Drawing Sheets

DISC SEQUENCER SUPPORTING PIPELINED AND NON-PIPELINED READ

RELATED APPLICATIONS

This application claims priority of U.S. provisional application Ser. No. 60/209,280, filed Jun. 2, 2000.

FIELD OF THE INVENTION

This application relates generally to a disc drive and more particularly to a disc sequencer in a disc drive.

BACKGROUND OF THE INVENTION

In a disc drive, data are stored on one or more discs coated with a magnetizable medium. Data are written to the discs by an array of transducers, typically referred to as read/write heads, mounted to a radial actuator for movement of the heads relative to the discs. The information is stored on a plurality of concentric circular tracks on the discs until such time that the data are read from the discs by the read/write heads. Each of the concentric tracks is generally divided into a plurality of separately addressable data sectors. The heads are used to transfer data between a desired track and an external environment, which includes, among many components, a host computer. During a read operation the read/write head senses the data previously written on the disc track and transfers the information to the external environment. During a write operation, data are written onto the disc track. Once the data are written to the disc, each sector holds a block of data, which is the absolute smallest quantity that can be written to the disc during a single write operation.

Typically, the read/write heads are positioned with respect to the disc surfaces by an actuator assembly driven by a voice coil motor. The voice coil motor is responsible for pivoting the actuator body about a pivot shaft, thus moving the heads across the disc surfaces. The actuator thus allows the heads to move back and forth in an accurate fashion between an inner radius and an outer radius of a disc. The actuator arm is driven by a control signal fed to the voice coil motor at the rear end of the actuator arm. A servo control system is used to sense the position of the actuator and control the movement of the read/write head above the disc using servo signals read from a disc surface in the disc drive. The servo control system relies on servo information stored on the disc. The signals from this information generally indicate the present position of the read/write head with respect to the disc, i.e., the current track position. The servo control system uses the sensed information to maintain head position or determine how to optimally move the read/write head to a new position centered above a desired track. The servo control system then delivers a control signal to the voice coil motor to position the read/write head over a desired new track or to maintain the position over the desired current track.

The transfer of files between the host computer and the disc is controlled in a multi-level setting characterized by a bi-level transfer scheme. At a macroscopic level, track sectors are selected to contain the data sectors of which the file is divided. More specifically, and in a microscopic sense, cells along a track are magnetized to correspond to the bit structure of the file for the purposes of subsequent reading. A disc drive typically includes a buffer to implement this bi-level transfer scheme. The purpose of the buffer is to accept the sectors of data during its transfer between the host computer and the disc and then transfer the data to the proper component—either the host computer or the disc.

Typically, the system microprocessor contains programming designed to locate the sectors on the track where the data are to be read from or written to. The microprocessor is also programmed to control the transfer of the file at the sector, or macroscopic, level. The transfer of data to and from the buffer is accomplished at a microscopic level in character-by-character fashion. The conventional method of accomplishing a transfer at the microscopic level is through the use of a buffer controller, a host interface controller, or a disc interface controller.

The transfer of a file from a disc to a host is carried out under the overall control of the system microprocessor and a more precise control of a disc interface controller. With respect to overall control, when a file is to be read from a disc, the host computer prompts the system microprocessor with generalized information pertaining to the file and the microprocessor selects a buffer segment to temporarily store the data as it is read from the disc. The microprocessor then sets up the transfer by issuing commands to the servo system to bring the read/write heads into radial alignment with the track that contains the sectors at which the file is stored. The microprocessor issues commands and control parameters to the disc interface controller to transfer one or more sectors from the disc to the buffer segment. Once stored in the buffer segment, the microprocessor issues commands to a host interface controller to initiate the transfer of the sectors of data from the buffer segment to the host.

With respect to more specific control, the disc interface controller controls the transfer of the blocks of data from the appropriate sectors on a disc to the buffer segment pursuant to commands issued by the system microprocessor once the read/write heads are positioned over the track that is to receive the file. The data are read from the disc by a read/write head and transmitted to a disc sequencer of the disc interface controller via a read/write channel, which decodes the data before it reaches the disc sequencer. Data decoded by the read/write channel and received by the disc sequencer are typically referred to as NRZ, or channel, data. The disc sequencer, which is the interface between the disc interface controller and the read/write channel, is also responsible for transmitting control signals through the channel to control accessing of the disc by the read/write head.

Conventional read/write channels combine trellis-coded partial response equalization with maximum-likelihood sequence detection based upon a Viterbi algorithm. A dramatic and constant increase in the bits per inch (BPI) and the tracks per inch (TPI) of a disc surface yields a proportional increase in the bit error rate (BER) of a disc drive. In order to handle the increasingly high BER, a Viterbi detector is used to perform the maximum-likelihood sequence detection. A post-processor is used to eliminate some of the dominant error events in electronic and media noise at the output of the Viterbi detector. The combination of the post processor and the Viterbi detector provides a net Signal Noise Ratio (SNR) performance relative to partial response maximum-likelihood (PRML) or enhanced partial response maximum-likelihood (EPRML) channels over the range of linear densities. A problem occurs in that the post-processor causes the overall read latency to potentially increase from 10 bytes to 30 or more bytes.

A pipelined read mode can be used in order to alleviate potential format efficiency hits caused by an increase in read latency. The key aspect associated with the typical pipelined read mode is the relatively small size of the gap (typically, 6–8 bytes) between sectors on the disc media. In contrast, a relatively large gap (typically, 25–50 bytes) between sectors on the disc media that is associated with a non-pipelined read mode actually adds to the inefficient characteristics of drives having the increasing read latency. Although current read/write channels support both non-pipelined and pipelined read modes, conventional disc sequencers cannot operate in the pipelined read mode thereby hindering current disc drive efficiency.

SUMMARY OF THE INVENTION

Against this backdrop the present invention has been developed. The present invention is a disc sequencer incorporating parallel state machines to support both pipelined and non-pipelined read modes. A read command, which may be associated with either the pipelined read mode or the non-pipelined read mode, is communicated to the disc sequencer from a system microprocessor through a microprocessor interface of the disc sequencer. The read command initializes the disc sequencer to control the transfer of a file stored on a recordable media through a read/write channel. The file, which contains sectors that are taken from the media, is transmitted through the read/write channel, and passed to a buffer prior to transfer to the host computer. The sectors of data are decoded by the read/write channel and monitored by the parallel state machines through a NRZ, or channel, interface of the disc sequencer. The parallel state machines are communicated the current field being read through the channel interface such that the parallel state machines can implement control over the data transfer at a sector-by-sector level.

In accordance with an embodiment of the present invention, the parallel state machines include a first state machine having an operational state dependent upon an operational state of a second state machine. The operational state of the first state machine, which is initially inactive, goes active once the operational state of the second state machine goes active. Additionally, following a change in the operational state of the first state machine from active to inactive, if the operational state of the second state machine is active, the operational state of the first state machine will immediately return active.

The operational states of the first and second state machines determine whether channel, or NRZ, data is to be transmitted to the buffer via the channel interface coupled to the read/write channel. The transfer is enabled if the operational state of the first state machine or the operational state of the second state machine is active. If both the operational states of the first state machine and the second state machine are inactive, a transfer of data between the read/write channel and the channel interface is precluded.

In accordance with other embodiments, the invention relates to a disc sequencer for controlling data transfer operations between a read/write channel and a buffer of a disc drive. The disc sequencer includes a first state machine and a second state machine. The first state machine and the second state machine both have one or more active operational states and one or more inactive operational states. The second state machine is coupled to the first state machine such that an operational state of the first state machine is determined based on a simultaneous operational state of the second state machine. A transfer of data is enabled if either the operational state of the first state machine or the operational state of the second state machine is active.

In accordance with still other embodiments, the invention relates to a state machine for controlling data transfer operations of a formatter between a read/write channel and a buffer of a disc drive. The state machine includes an idle state, a standby state, a sync detect state, and a read state. While in the idle state, the state machine awaits reception of a read command to a microprocessor interface of the disc sequencer. The read command identifies a file to be read through the read/write channel. The idle state concludes upon receipt of the read command. While in the standby state, the state machine awaits a change in an operational state of a parallel state machine. The parallel state machine changes operational state upon detection of a sector pulse associated with a sector of the file to be read through the read/write channel. The standby state is initiated upon receipt of the read command and concludes upon the change in the operational state of the parallel state machine. While in the sync detect state, the state machine awaits detection of a sync mark of the sector being read through an NRZ, or channel, interface, which is coupled to the read/write channel. The sync detect state is initiated upon detection of the sector pulse by the parallel state machine and concludes upon detection of the sync mark. While in the read state, the state machine awaits detection of a trailing edge of a data field of the sector being read through the channel interface. During the read state, data are transferred from the read/write channel to the buffer. The read state is initiated upon detection of the sync mark and concludes upon detection of the trailing edge.

These and various other features, as well as advantages which characterize the present invention, will be apparent from a reading of the following detailed description and a review of the associated drawings.

DETAILED DESCRIPTION

The present invention and its various embodiments are described in detail below with reference to the figures. When referring to the figures, like structures and elements shown throughout are indicated with like reference numerals.

Figure 1:
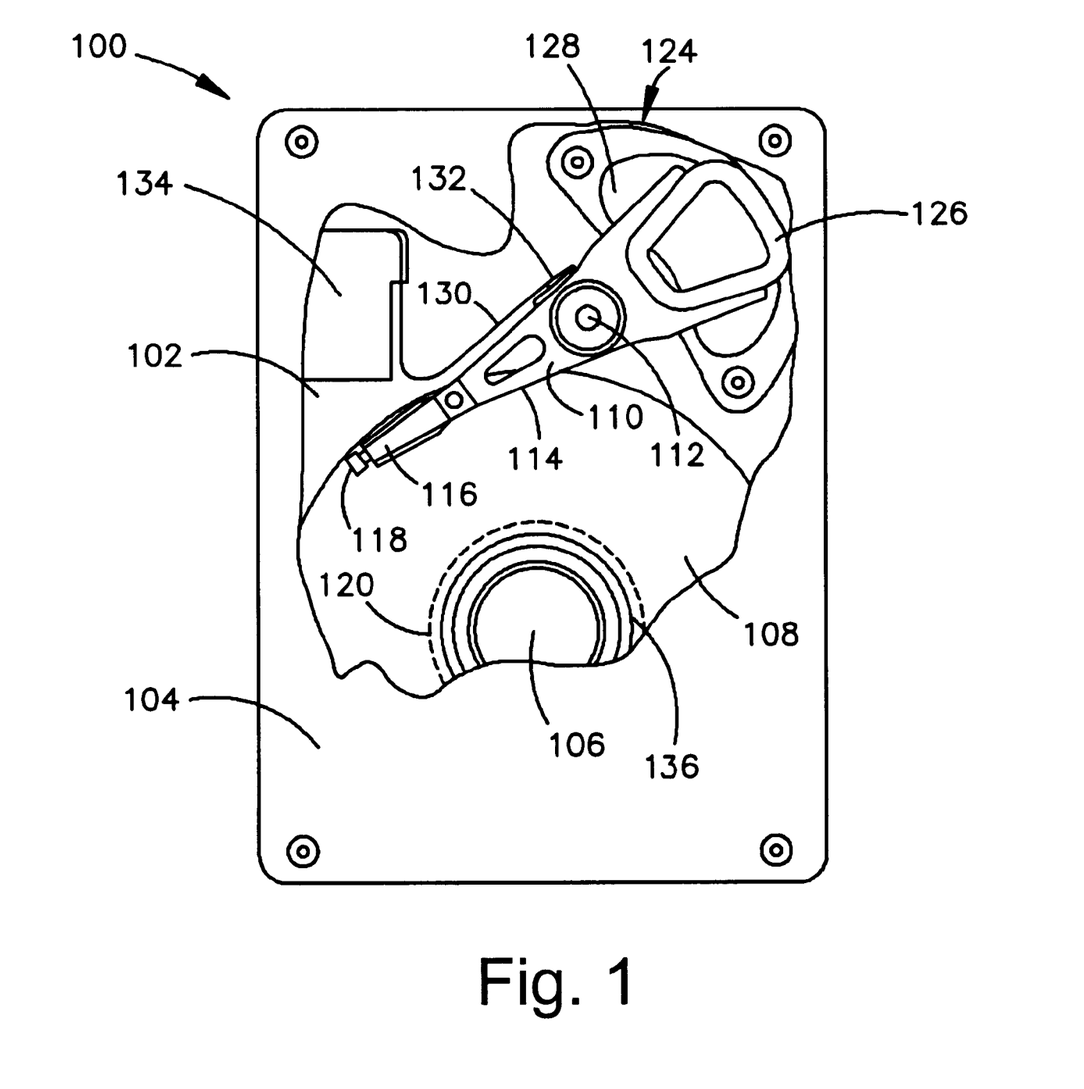
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive 100 in a conventional manner. The components include a spindle motor 106 which rotates one or more data storage discs 108 at a constant high speed. A magnetic media disc 108 is used to illustrate a preferred embodiment of the present invention, but the present invention may be implemented using other types of data storage discs. Information is written to and read from tracks 120 on the discs 108 through the use of an actuator assembly 110, which rotates about a bearing shaft assembly 112 positioned adjacent to the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer 118, commonly referred to as a read/write head, which includes an air bearing slider enabling the read/write head 118 to fly in close proximity above the corresponding surface of the associated disc 108.

The radial position of the read/write heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the read/write heads 118 are caused to move across the surfaces of the discs 108.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected; the head wires being routed along the actuator arms 114 and the flexures 116 to the heads 118. The printed circuit board 132 typically includes circuitry for controlling the write currents applied to the read/write heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
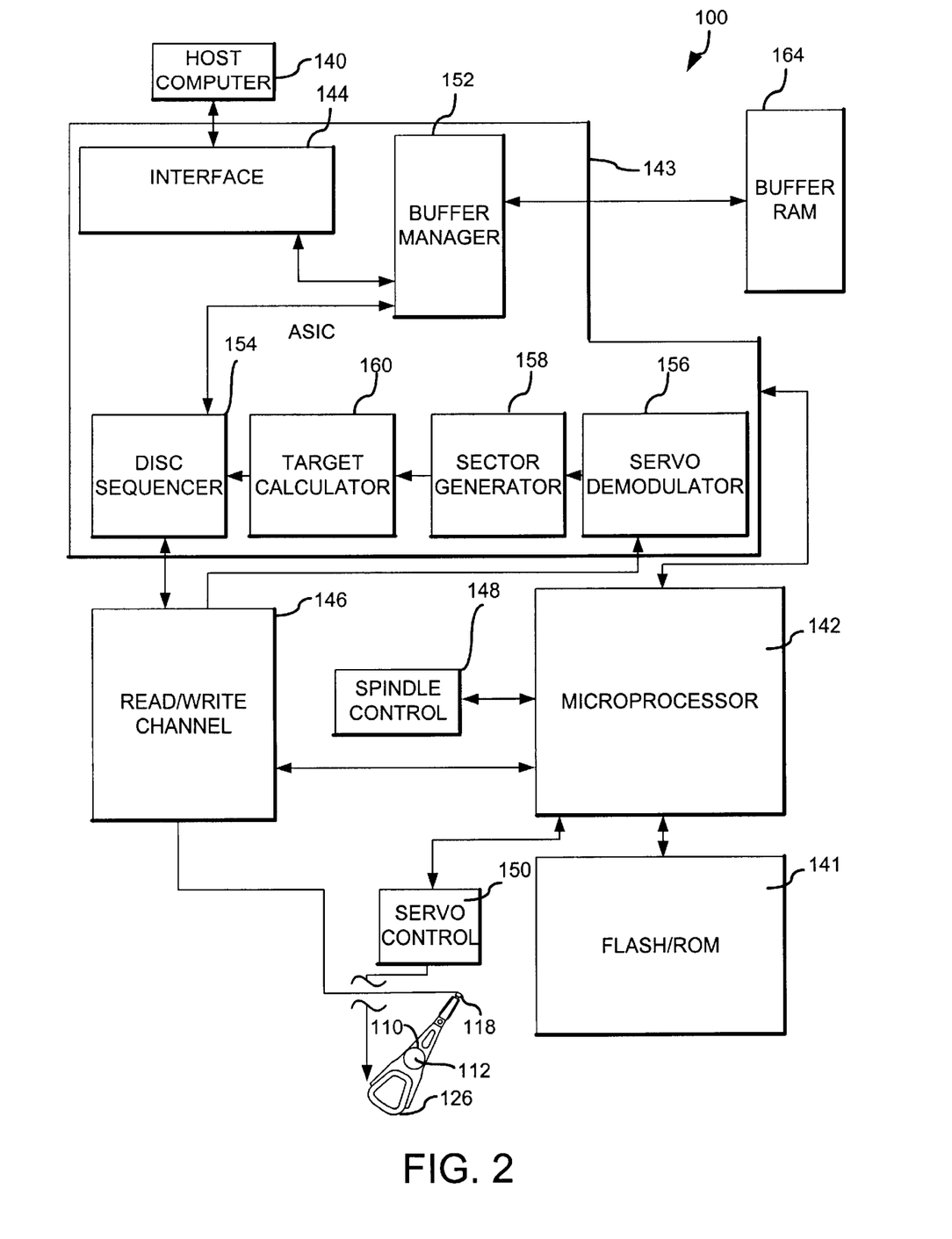
FIG. 2 is a functional block diagram generally showing the main functional components used to control the disc drive of FIG. 1 including a disc sequencer.

Referring now to FIG. 2, shown therein is a functional block diagram of the disc drive 100 of FIG. 1, generally showing the main functional circuits used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in controller memory (MEM) 141. The MEM 141 can include random access memory (RAM), read only memory (ROM), and other sources of resident memory for the microprocessor 142. The microprocessor 142 controls operations of a disc interface controller 143. The disc interface controller 143 includes an interface protocol 144, a buffer manager 152, a formatter 154, also referred to as a disc sequencer, a servo demodulator 156, a sector generator 158, and a target calculator 160. The disc sequencer 154 incorporates parallel state machines (not shown) for controlling a channel read gate signal 306 (FIG. 3) that enables the head 118 to transfer media data to the read/write channel 146 and a combined internal read gate signal 315 (FIG. 3) that enables the transfer of channel data to the disc sequencer 154 via the read/write channel 146.

Data are transferred between the host computer 140 and the disc drive 100 by way of the interface 144, the buffer manager 152, the disc sequencer 154, and the buffer 164. The buffer 164 is used to facilitate high-speed data transfer between the host computer 140 and the disc drive 100. Data to be written to the disc drive 100 are thus passed from the host computer 140 to the interface 144, through the buffer 164, then further through the disc sequencer 154 and then to the read/write channel 146, which encodes and serializes the data and provides the requisite write current signals to the heads 118. To retrieve data that has been previously stored by the disc drive 100, read signals are generated by the heads 118 and provided to the read/write channel 146. Specifically, a transfer of data between the read/write head 118 and the read/write channel 146 is enabled if the status of the channel read gate signal 306 is high. Under such circumstances, the read/write channel 146 performs decoding and outputs the retrieved data through the disc sequencer 154 to the buffer 164. Specifically, a transfer of data to a channel interface 303 (FIG. 3) of the disc sequencer 154 via the read/write channel 146 is enabled if the status of the combined internal read gate signal 315 is high. The data are then passed from the buffer 164 to the interface 144 for subsequent transfer to the host computer 140.

The servo demodulator 156 is operably connected to a read/write channel 146. The servo demodulator 156 interprets signals from the read/write channel 146 and sends a modified signal to the sector generator 158. Additionally, the servo demodulator 156 accurately synchronizes timing of the disc interface controller 143 to data on the disc 108 media. The sector generator 158 utilizes the accurate timing by the servo demodulator 156 to generate sector pulses representing the beginning of each sector of data on the disc 108 media. Specifically, the sector generator 158 calculates where all sectors start on the disc 108 and creates sector pulses associated with those locations. This information is transferred to the target calculator 160. The target calculator 160 selects which sector pulses to pass on to the formatter 154 thereby informing the formatter 154 when the head 118 is over the desired sector for access. The formatter 154 uses this pulse to access the disc 108 through the read/write channel 146.

The discs 108 (FIG. 1) are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. During a seek operation the microprocessor 142 receives information regarding the velocity and acceleration of the head 118, and uses that information in conjunction with a model, stored in memory 141, to communicate with the servo control circuit 150. The servo control circuit 150 applies a controlled amount of current to the voice coil motor coil 126, thereby causing the actuator assembly 110 to be pivoted.

Figure 3:
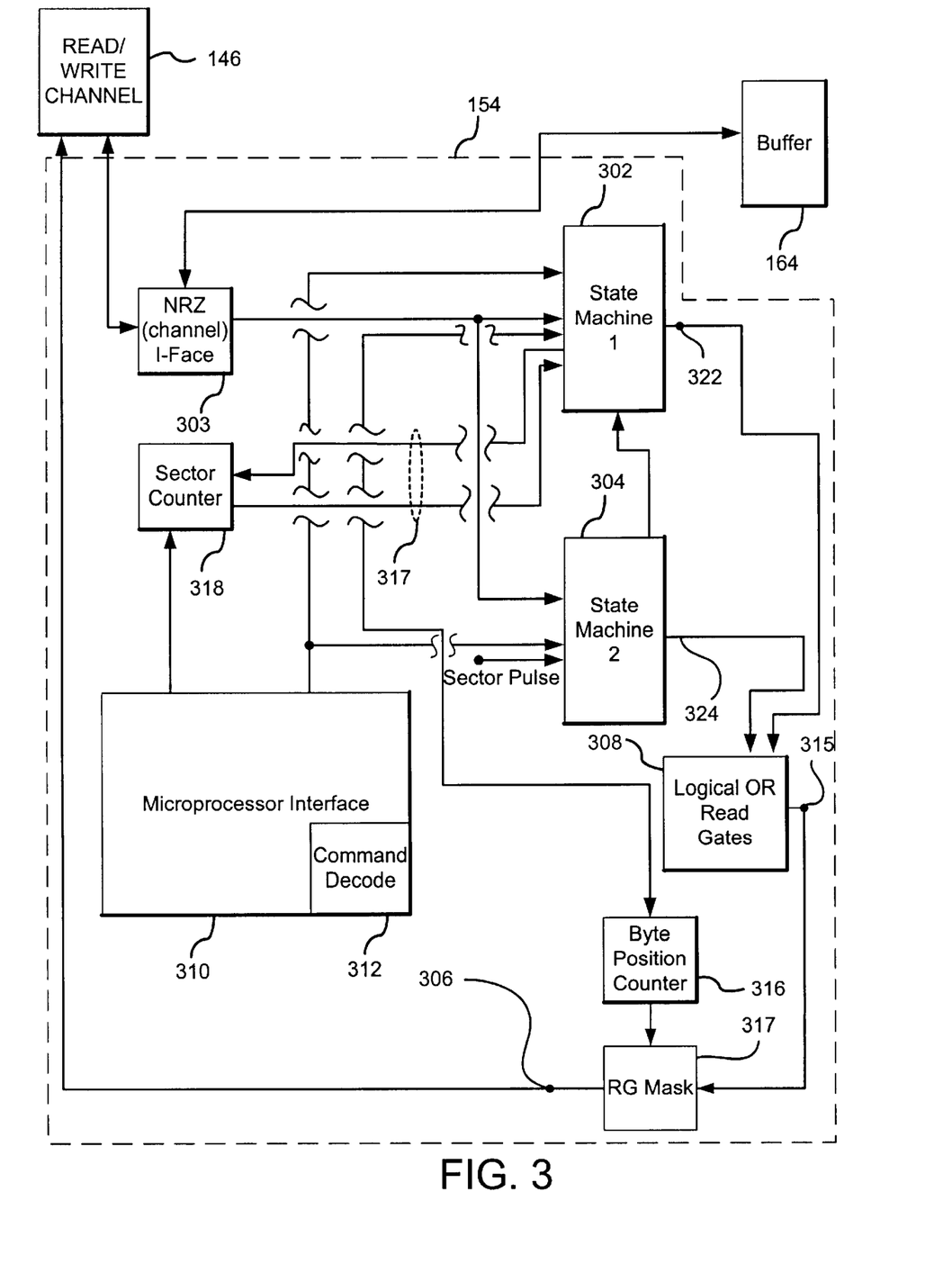
FIG. 3 is a functional diagram of the disc sequencer shown in FIG. 2 in accordance with a preferred embodiment of the present invention, the disc sequencer having parallel state machines.

A disc sequencer 154 and parallel state machines 302, 304 of the disc sequencer 154, in accordance with a preferred embodiment of the present invention, are shown in FIG. 3. The disc sequencer 154 controls the status of a channel read gate signal 306 and a combined internal read gate signal 315 that enable the overall transfer of data between a disc 108 media and a buffer 164. More particularly, a transfer of "media" data between a read/write head 118 and the read/write channel 146 is enabled if the status of the channel read gate signal 306 is high but disabled if the status of the channel read gate signal 306 is low. Further, a transfer of "channel" data to the channel interface 303 of the disc sequencer 154 via the read/write channel 146 is enabled if the status of the combined internal read gate signal 315 is high and disabled if the status of the combined internal read gate signal 315 is low. A read gate (RG) mask module 317 truncates the combined internal read gate signal 315 to form the channel read gate signal 306.

The disc sequencer 154 reads desired sectors from the disc media 108 as selected by the target calculator 160 (FIG. 1) if the channel read gate signal 306 is high. When the channel read gate signal 306 is high, "media" data are read from the disc 108 media to the read/write channel 146. The data, referred to as "channel" data as it is being passed through the read/write channel 146, is then received by the disc sequencer 300 via a NRZ, or channel, interface 303 if the status of the combined internal read gate signal 315 is high. As channel data are being received into the disc sequencer 154, the byte position counter 316 counts byte positions of data received through the channel interface 303. The first byte of data following the sync byte is byte 0. The last byte of ECC for a sector with n data and ECC bytes is byte (n−1). Channel data transmitted through the channel interface 303 are subsequently transferred from the disc sequencer 154 to a buffer 164 for storage prior to being transmitted to a host computer in response to a read operation originally transmitted from the host computer.

The disc sequencer 154 is under the overall control of a system microprocessor. Read commands from the system microprocessor are communicated to the disc sequencer 154 through a microprocessor interface 310. A read command is associated with a particular file to be read from a disc 108 (FIG. 1) and subsequently transmitted to the host computer.

The microprocessor interface 310 includes a command decode module 312 to decode commands transmitted from the microprocessor 142 (FIG. 1) into a format recognizable by the components of the disc sequencer 154. Once the read command is decoded, the microprocessor interface 310 loads the number of sectors in the file to be read into a sector counter 318. The microprocessor interface 310 also initializes a second state machine 304 to detect sector pulses associated with the beginning of each sector of the file to be read from the disc 108.

In accordance with a preferred embodiment of the invention, the first state machine 302 is used in parallel with the second state machine 304 in order to control operation of a channel read gate signal 306 that enables media data to be retrieved from the disc 108 media and transferred to the buffer 164 via the read/write channel 146. More specifically, control of whether channel data is being transferred to the channel interface 303 is administered by a combined internal read gate signal 315. If the combined internal read gate signal 315 is high, then channel data output from the read/write channel 146 are communicated through the channel interface 303 to the buffer 164. In contrast, if the combined internal read gate signal 315 is low, then channel data output from the read/write channel 146 are not communicated through the channel interface 303 to the buffer 164. Furthermore, the status of the channel read gate signal 306 is controlled by the combined internal read gate signal 315, which in turn, has a status defined by a logical combination of operational states of the first and the second state machines 302, 304. The combined internal read gate signal 315 and the dependency of the channel read gate signal 306 on the combined internal read gate signal 315 is discussed below.

Figure 4:
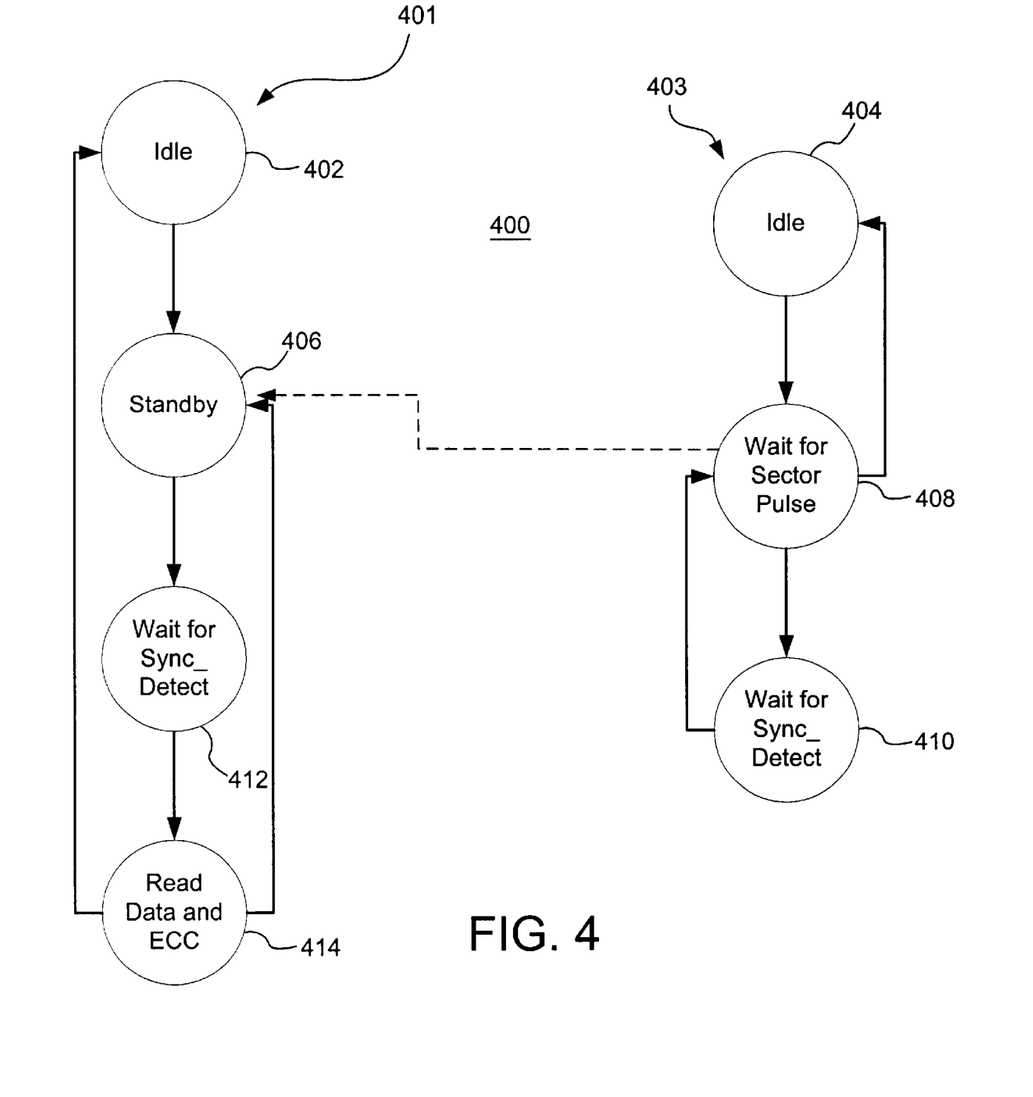
FIG. 4 is a state diagram that illustrates operational characteristics of the parallel state machines of the disc sequencer shown in FIG. 3.

The first state machine 302 and the second state machine 304 are both associated with operational states that generally specify whether the status of the combined internal read gate signal 315 is high or low, and thus whether the status of the channel read gate signal 306 is high or low. The operational states are defined as either "active" or "inactive." With reference to FIG. 4, the active operational states of the first state machine 302 comprise a sync detect state 412 and a read data state 414 and the active operational state of the second state machine comprises a sync detect state 410. With further reference to FIG. 4, the inactive operational states of the first state machine 302 comprise an idle state 402 and a standby state 406 and the inactive operational states of the second state machine 304 comprise an idle state 404 and a sector detect state 408.

Referring back to FIG. 3, the first state machine 302 and the second state machine 304 transmit first and second internal read gate signals 322, 324, respectively, that specify the current operational states of the first and second state machines 302, 304. The first state machine 302 is constructed such that if the operational state of the first state machine 302 is active, then the status of the first internal read gate signal 322 is high and if the operational state of the first state machine 302 is inactive, then the status of the first internal read gate signal 322 is low. Likewise, the second state machine 304 is constructed such that if the operational state of the second state machine 304 is active, then the status of the second internal read gate signal 324 is high and if the operational state of the second state machine 304 is inactive, then the status of the second internal read gate signal 324 is low. Accordingly, the combination of the first state machine 302 and the second state machine 304 might be referred to as "parallel state machines. Hence, the second state machine may be referred to as a "parallel" state machine. If either operational state of the first state machine 302 or the second state machine 304 is active, then the combined internal read gate signal 315 is high.

The operational state of the first state machine 302 and the operational state of the second state machine 304 are input to a logic module 308 via the first internal read gate signal 322 and the second internal read gate signal 324, respectively. The logic module 308 combines the operational state of the first state machine 302 with the operational state of the second state machine 304 logically to form the combined internal read gate signal 315. The combined internal read gate signal 315 rises at each sector pulse, as communicated by the second internal read gate signal 324, and falls after all read data and ECC information are transferred from the read/write channel 146, as communicated by the first internal read gate signal 322. The output of the RG mask module 317 is the channel read gate signal 306, the state of which determines whether media data are communicated from the read/write head 118 to the read/write channel 146. As mentioned earlier, if the status of the channel read gate signal 306 is high then media data are being transmitted from the head 118 to the read/write channel 146. If the status of the channel read gate signal 306 is low, then media data are not currently being transmitted from the head 118 to the read/write channel 146.

As mentioned, the operational state of the first state machine 302 is input into the logic module 308 via the first internal read gate signal 322. If the operational state of the first state machine 302 is active, ie, sync detect state 412 (FIG. 4) or read data state 414 (FIG. 4), then the first internal read gate signal 322 is high. If the state of the first state machine 302 is inactive, ie, idle state 402 (FIG. 4) or standby state 406 (FIG. 4), then the first internal read gate signal 322 is low. Likewise, the operational state of the second state machine 304 is input into the logic module 308 via the second internal read gate signal 324. If the operational state of the second state machine 304 is active, ie, sync detect state 410 (FIG. 4), then the second internal read gate signal 324 is high. If the operational state of the second state machine 304 is inactive, ie, idle state 404 (FIG. 4) or sector detect state 408 (FIG. 4), then the second internal read gate signal 324 is low. If either the first internal read gate signal 322 or the second internal read gate signal 324 is high, the combined internal read gate signal 315 is high. If the combined internal read gate signal 315 is high and the read gate mask module 317 is inactive, meaning the byte position counter 316 indicates data are still under the head, then the channel read gate signal 306 is high. As mentioned above, if the channel read gate signal 306 is high, the transfer of media data to the read/write channel 146 is enabled.

In accordance with a preferred embodiment, once a read command is transmitted to the microprocessor interface 310, a pulse is transmitted to both state machines 302 and 304 thereby initializing the state machines 302 and 304. The first state machine 302, which is initially inactive, then awaits a change of state in the second state machine 304 that occurs once a sector pulse is detected.

The operational state of the first state machine 302 goes active thereby forcing the first internal read gate signal 322 high once the second state machine 304 receives a sector pulse from the target calculator 160 (FIG. 2). The sector pulse indicates that the beginning of a sector to be read is currently passing under the transducer 118. Accordingly, the operational state of the second state machine 304 is tied to an input of the first state machine 302. With respect to the first sector of the file being read, once the second internal read gate signal 324 goes high, the first state machine 302 forces the first internal read gate signal 322 high. With respect to subsequent sectors of the file being read, if the second internal read gate signal 324 is high when the first internal read gate signal 322 goes low, then the first internal read gate signal 322 will be forced high on the next clock period.

Once a sector has been detected and the operational state of the second state machine 304 goes active, the operational state of the first state machine 302 goes active. The first state machine 302 and the second state machine 304 then wait for the detection of the sync mark of the particular sector denoted by the sector pulse. Due to the dependency of the first state machine 302 on the second state machine 304, the first internal read gate signal 322 goes high one clock period following detection that the second state machine 302 has received a sector pulse. The sync mark is detected through the channel interface 303 monitoring the channel data stream being communicated through the read/write channel 146. Once the sync mark is detected, the operational state of the first state machine 302 remains active thereby maintaining the first internal read gate signal 322 high. In contrast, the operational state of the second state machine 304 goes inactive thereby forcing the second internal read gate signal 324 low upon detection of the sync mark through the channel interface 303. If either the first internal read gate signal 322 or the second internal read gate signal 324 are high, then the logic module 308 forces the combined internal read gate signal 315 high.

Once the sync mark of the sector that is being read through the channel interface 303 is detected by the first state machine 302, the operational state of the first state machine 302 will remain active in order to ensure that the combined internal read gate signal 315 remains high so that the entire data field 534 (FIG. 5) of the sector may be read. Once the entire data field 534 of that sector has been read, as monitored by the first state machine 302 through the channel interface 303, a signal is transmitted from the first state machine 302 to the sector counter 318.

The value of the sector counter 318 is decreased by one at the conclusion of each data field, denoting that a sector has been read from the file.

The value of the sector counter 318 is examined by the first state machine 302 in order to determine whether there are any more sectors of that particular file to be read. If the value of the sector counter 318 examined by the first state machine 302 does not equal zero, then the operational state of the first state machine 302 goes inactive thereby forcing the first internal read gate signal 322 low until a sector pulse has been transmitted to the second state machine 304 from the target calculator 160 (FIG. 2). In contrast, if the value of the sector counter 318 equals zero, then the operational state of the first state machine goes inactive until a subsequent read command is transmitted to the disc sequencer 154. The first state machine 302 is operably connected to the second state machine 304 such that the operational state of the first state machine 302 is dependent upon the operational state of the second state machine 304. The operational state of the second state machine 304 is active if the second state machine 304 has received a sector pulse and the second state machine 304 is currently awaiting detection of a sync mark, as monitored through the channel interface 303. If the operational state of the second state machine 304 is active, then the operational state of the first state machine 302, which is currently inactive, will return active thereby forcing the first internal read gate signal 322 high.

Figure 5:
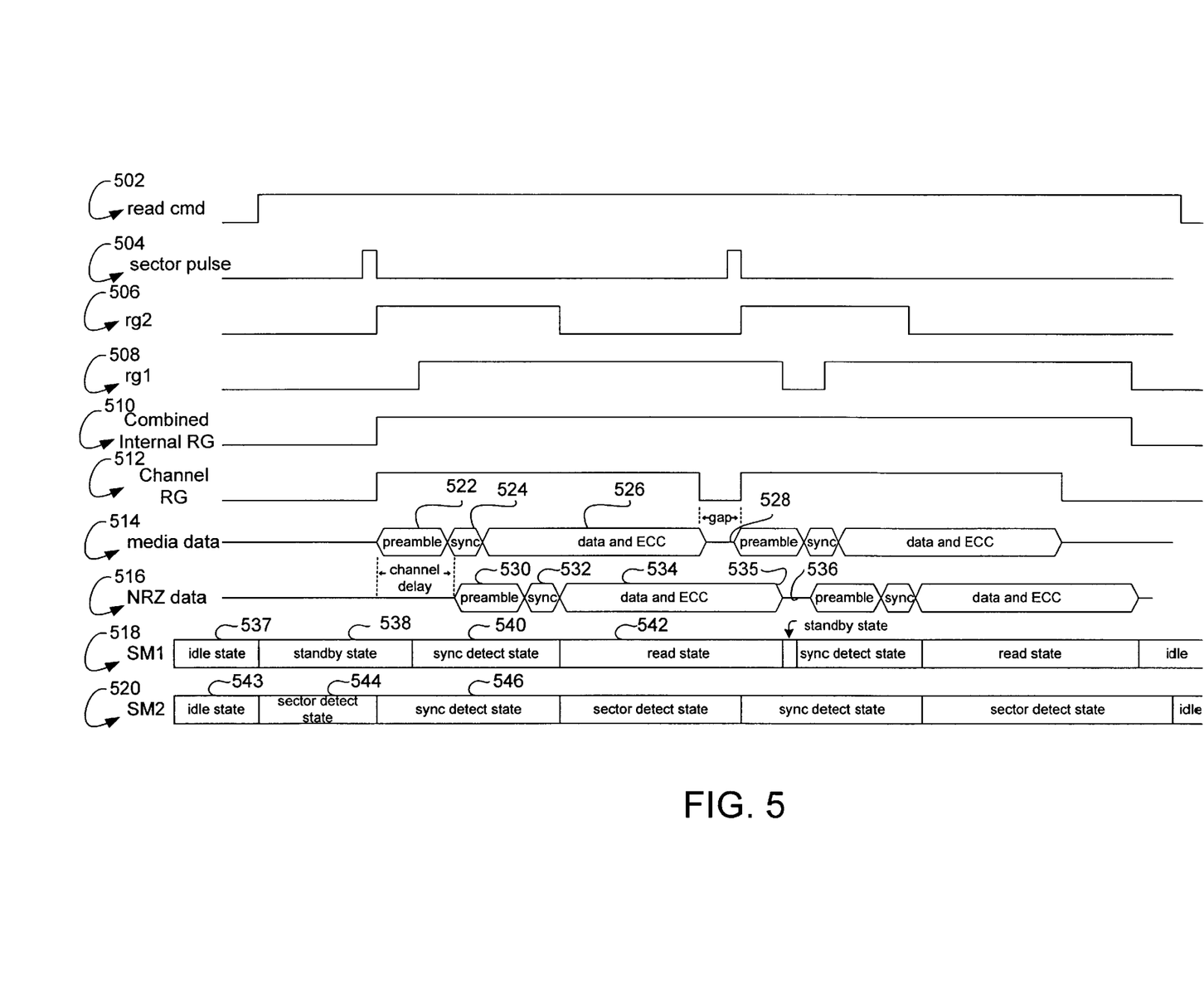
FIG. 5 is a timing diagram illustrating the operational characteristics illustrated by the state diagram in FIG. 4.

The relationship associated with the parallel state machines 302 and 304 in accordance with a preferred embodiment is further illustrated by a state diagram in FIG. 4 and a timing diagram in FIG. 5. A state diagram 400 illustrating operational characteristics of parallel state machines incorporating aspects of the first state machine 302 (FIG. 3) and the second state machine 304 (FIG. 3), respectively, is shown in FIG. 4. Specifically, the operational states of the first state machine 302 are illustrated in a sub-diagram 401 and the operational states of the second state machine 304 are illustrated in a sub-diagram 403. Sub-diagrams 401 and 403, together, form the state diagram 400 and provide an illustration of control functions of the disc sequencer 154 (FIG. 3) as the disc sequencer 154 oversees operations associated with reading data from a data storage medium 108 (FIG. 1) to a buffer 164 (FIG. 2) via a read/write channel 146 (FIG. 3).

Initially, the first state machine 302 is in an idle state 402 and the second state machine 304 is in an idle state 404. While the first state machine 302 is in the idle state 402, the status of the first internal read gate signal 322 (FIG. 3) is low. Likewise, while the second state machine 304 is in the idle state 404, the status of the second internal read gate signal 324 (FIG. 3) is low. Upon receiving a read command to read a file stored on a data storage medium 108, a microprocessor 142 (FIG. 2) initializes the first state machine 302 to a standby state 406 and the second state machine 304 to a sector detect state 408. The sector detect state 408 is the state of the second state machine 304 as the second state machine 304 awaits detection of a sector of the file being read through the read/write channel 146. Location of the sector is communicated to the second state machine 304 by a sector pulse. Once a sector pulse is detected, the second state machine 304 changes operational state to a sync detect state 410 thereby forcing the second internal read gate signal 324 high. The second state machine 304 will remain in the sync detect state 410 until a sync mark is detected. Once a sync mark is detected, the second state machine 304 changes operational state to the sector detect state 408 thereby forcing the second internal read gate signal 324 low. The second state machine 304 continues to change operational states between the sector detect state 408 and the sync detect state 410 until the first state machine 302 returns to the idle state 402. Once the first state machine 302 returns to the idle state 402, the second state machine 304 returns to the idle state 402.

The first state machine 302 remains in the standby state 406 until the second state machine 304 has entered the sync detect state 410. Once the second state machine 304 enters the sync detect state 410, the first state machine 302 changes operational states to a sync detect state 412 thereby forcing the first internal read gate signal 322 high. The first state machine 302 will remain in the sync detect state 412 until a sync mark is detected by the first state machine 302. Once a sync mark is detected by the first state machine 302, the first state machine 302 changes operational state to a data read state 414. While in the data read state 414, the data field of the sector is read via the channel interface 303 (FIG. 3) reading the channel data from a read/write channel 146. The data are subsequently transferred from the disc sequencer 154 into a buffer 164 (FIG. 3) and eventually to the host computer 140 (FIG. 2).

The first state machine 302 remains in the data read state 414 until the end of the data field. At the end of the data field, the first state machine 302 either reverts back to the standby state 406 or the idle state 402 thereby forcing the first internal read gate signal 322 low. The first state machine 302 reverts back to the standby state 406 if the sector previously read was not the last sector of the file being read pursuant to the read command. Whether or not the previously read sector was the last sector is determined by a sector count value stored in a sector counter 318 (FIG. 3). If the sector count value does not equal zero, then the first state machine 302 returns to the standby state 406. If, however, the sector count value is equal to zero, the first state machine 302 returns to the idle state 402. The sector count is initially equal to the number of sectors in the file that is to be read by the disc sequencer 154. Each instance that the first state machine 302 enters the standby state 406, the value of the sector counter 318 is decreased by one. As described earlier, once the value of the sector count is equal to zero, the first state machine 302 reverts to the idle state 402, thereby triggering reversion of the second state machine 304 to the idle state 404.

A timing diagram corresponding to the state diagram 400 of FIG. 4 is shown in FIG. 5. With respect to FIG. 5, timing parameters are shown to illustrate operations of the first state machine 302 and the second state machine 304 described in conjunction with the state diagram 400 of FIG. 4. The timing diagram 500 includes a read command timing parameter 502, a sector pulse timing parameter 504, a first internal read gate signal timing parameter 508, a second internal read gate signal timing parameter 506, a combined internal read gate signal timing parameter 510, a channel read gate signal timing parameter 512, a media data timing parameter 514, a channel data timing parameter 516, a first state machine timing parameter 518, and a second state machine timing parameter 520. The state of each timing parameter 502, 504, 506, 508, 510, 512, 514, 516, 518, and 520 is initially low, or idle. The state of each timing parameter 504, 506, 508, 510, 512, 514, 516, 518, and 520 is dictated by the state of the read command timing parameter 502. In order for the state of any of the timing parameters 504, 506, 508, 510, 512, 514, 516, 518, and 520 to go high, the read command timing parameter 502 must be high.

The read command timing parameter 502 shows when a read command has been sent to the disc sequencer 154 (FIG. 3) from a system microprocessor 142 (FIG. 2). The state of the read command timing parameter 502 is based upon whether a read command has been received by the disc sequencer 154. Accordingly, the state of the read command timing parameter 502 is low until a read command is received. Once a read command is received by the microprocessor interface 310 (FIG. 3), the state of the read command timing parameter 502 goes high and remains high for the length in time that it takes the disc sequencer 154 to read the file. As described earlier, the microprocessor interface 310 is responsible for receiving the read command and the channel interface 303 (FIG. 3) interfaces with the read/write channel 146 to direct the channel data to the buffer 164 (FIG. 3).

The state of the sector pulse timing parameter 504 remains low until a sector pulse is transmitted to the second state machine 304 (FIG. 3) from the target calculator 160 (FIG. 2). The state of the sector pulse timing parameter 504 remains high for a single clock period at the point in time when the beginning of a sector passes under the head. The state of the second internal read gate signal timing parameter 506 shows the status of the second internal read gate signal 324 (FIG. 3), i.e., whether the second internal read gate signal 324 is high or low. The state of the second internal read gate signal timing parameter 506 remains low unless a read command has been received by the disc sequencer 154 and a sector pulse has been received by the second state machine 304. Accordingly, the state of the second internal read gate signal timing parameter 506 goes high one clock cycle after the state of the sector pulse timing parameter 504 goes high if the state of the read command timing parameter 502 is high. The state of the second internal read gate signal timing parameter 506 remains high until one clock period following detection, in the channel data stream, of a sync mark 532 of the sector associated with the sector pulse.

The state of the first internal read gate signal timing parameter 508 shows the status of the first internal read gate signal 322 is high or low. The state of the first internal read gate signal timing parameter 508 remains low unless the second internal read gate signal 324 is high. Accordingly, the state of the first internal read gate signal timing parameter 508 goes high one clock period after the state of the second internal read gate signal timing parameter 506 goes high. The state of the first internal read gate signal timing parameter 508 remains high until the end of a data field 534 of the sector being read. If the state of the second internal read gate signal timing parameter 506 is high when the state of the first internal read gate signal timing parameter 508 goes low, the state of the first internal read gate signal timing parameter 508 will return high on the next clock period.

The state of the combined internal read gate signal timing parameter 510 shows the status of a combined internal read gate signal 315 (FIG. 3), i.e., whether the combined internal read gate signal 315 is high or low. The state of the combined internal read gate signal timing parameter 510 remains low unless either the first internal read gate sign al 322 or the second internal read gate signal 324 are high. Accordingly, if the state of either the first internal read gate signal timing parameter 508 or the second internal read gate signal timing parameter 510 are high, the state of the combined internal read gate signal timing parameter 510 will also be high.

The state of the channel read gate signal timing parameter 512 shows the status (i.e., high or low) of the channel read gate signal 306 controlling whether media data are transmitted from the read/write head 118 to the read/write channel 146. The state of the channel read gate signal timing parameter 512 remains low until the combined internal read gate signal timing parameter 510 goes high. The media data are divided into a preamble field 522, a sync field 524, and a data field 526. The time that the fields 522, 524 and 526 are read through the read/write channel 146 relative to each of the timing parameters 502, 504, 506, 508, 510, 512, 516, 518 and 520 is shown by the media data timing parameter 514. The state of the channel read gate signal timing parameter 512 is high beginning at the preamble 522 of the sector on the disc media being read by the head 118 and transmitted to the read/write channel 146. The state of the channel read gate signal timing parameter 512 remains high until the end of the data field 526. The state of the channel read gate signal timing parameter 512 is low during a gap 528 between the end of the data field 526 of the sector and the preamble field 522 of the subsequent sector.

Whereas the channel read gate signal timing parameter 512 is associated with the media data being sent to the read/write channel 146, the combined internal read gate signal timing parameter 510 is related to the channel (NRZ) data timing parameter 516, which shows a representation, relative to time, of the channel data as it is read through the channel interface 303. Additionally, due to the dependence of the status of the channel read gate signal 306 (FIG. 3) on the status of the first internal read gate signal 322 and the second internal read gate signal 324, the channel data timing parameter 516 is also related to the first internal read gate signal timing parameter 508 and the second internal read gate signal timing parameter 506.

The channel data stream is divided into a preamble field 530, a sync field 532, and a data field 534. The time that the fields 530, 532 and 534 are output from the read/write channel 146 relative to each of the timing parameters 502, 504, 506, 508, 510, 512, 514, 518 and 520 is shown by the channel data timing parameter 516. Additionally, the channel data stream includes a gap 536 between the end of the data field 534 of each sector and the preamble field 530 of the subsequent sector. The gap 536 of the channel data stream is the same number of clock periods wide as the gap 528 between sectors on the disc 108 media. The state of the combined internal read gate signal timing parameter 510 is high prior to reading of the preamble field 520 of the first sector of the file and remains high, as controlled by the first state machine 302 and the second state machine 304, until the data field 534 of all the sectors of the file have been read.

The first state machine timing parameter 518 shows operational states of the first state machine 302 as it controls read operations associated with the channel data stream using the first internal read gate signal 322. Once a read command is received, the first state machine 302 enters a standby state 538, as shown in the first state machine timing parameter 518. While in the standby state 538, the first state machine 302 waits for the second state machine 304 to enter the sync detect state 546. The second state machine timing parameter 520 shows operational states of the second state machine 304 as it controls state change operations of the first state machine 302 using the second internal read gate signal 324. The first state machine 302 and the second state machine 304 may be referred to as parallel state machines due to the dependency of the first state machine 302 on the second state machine 304. Once a read command is received, the second state machine 304 enters a sector detect state 544, as shown in the second state machine timing parameter 520. The second state machine 304 remains in the sector detect state 544 until one clock period following reception of a sector pulse. Once the sector pulse is received, the second state machine 304 enters a sync detect state 546. As seen on the timing diagram 500, the second state machine timing parameter 520 changes state to the sync detect state 546 one clock period following the change of state of the sector pulse timing parameter 504. The second state machine 304 remains in the sync detect state 546 until a sync mark is detected on the sector currently being read through the read/write channel 146. Once the sync mark is detected, as shown on the second state machine timing parameter 520, the second state machine 304 reverts to the sector detect state 544.

As shown by the first state machine timing parameter 518, the first state machine 302 changes operational state to a sync detect state 540 once the second state machine 304 enters the sync detect state 546. The first state machine 302 then awaits detection of the sync mark on the sector being read through the read/write channel 146. Once the sync mark is detected, as shown on the first state machine timing parameter 518, the first state machine 302 enters the read state 542. The read state 542 ensures that the combined internal read gate signal 315 remains high as the data field 534 of the channel data stream is output by the read/write channel 146. Accordingly, the timing diagram 500 shows the first state machine timing parameter 518 in the read state 542 over the entire data field 534. Once the entire data field 534 has been read, the first state machine 302 changes operational state to the standby state 538 and awaits detection of the subsequent sector pulse by the second state machine 304, as shown in the first state machine timing parameter 518. If the second state machine 304 is already in the sync detect state 546, then the first state machine 302 changes operational state to the sync detect state 542 on the next clock period, as shown in the first state machine timing parameter 518. If all sectors have been read, the second state machine 304 transitions to the idle state 543 from the sector detect state 546 approximately one clock period after the first state machine 302 reverts to the idle state 537.

In summary, the present invention may be viewed as a disc sequencer (such as 154) for controlling data transfer operations of a read/write channel (such as 146) transferring channel data between a transducer (such as 118) and a buffer (such as 164) of a disc drive (such as 100). The disc sequencer (such as 154) includes a first state machine having at least one active operational state and at least one inactive operational state. The disc sequencer (such as 154) also includes a second state machine (such as 304), which has at least one active operational state and at least one inactive operational state, coupled to the first state machine (such as 302) such that a current operational state of the first state machine (such as 302) is determined based on a simultaneous operational state of the second state machine (such as 304). A data transfer is enabled if at least one operational state of the first state machine (such as 302) or the second state machine (such as 304) is active. The operational state of the second state machine (such as 304) goes active upon detection of a sector pulse identifying a particular sector to be read.

The disc sequencer (such as 154) includes a channel data interface (such as 303) that is operably connected to the first state machine (such as 302) and the second state machine (such as 304). The first state machine (such as 302) detects a sync mark field (such as 532) and a data field (such as 534) of the sector being read through the channel data interface (such as 303). The second state machine (such as 304) detects the sync mark field (such as 532) of the sector being read through the channel data interface (such as 303). The operational state of the second state machine (such as 304) goes inactive upon detection of the sync mark field (such as 532). The operational state of the first state machine (such as 302) goes active one clock period following communication that the operational state of the second state machine (such as 304) is active. The operational state of the first state machine (such as 302) remains active until a trailing edge (such as 535) of the data field (such as 534).

The channel read gate signal (such as 306) controls the transfer of media data from the read/write head (such as 118) to a read/write channel (such as 146). The internal read gate signal (such as 315) controls status of a channel data interface (such as 303), ie, whether the channel data interface (such as 303) enables a transfer of data between the read/write channel (such as 146) and a buffer (such as 164). The channel data interface (such as 303) is operably connected to the first state machine (such as 302) and the second state machine (such as 304). The first state machine (such as 302) detects a sync mark field (such as 532) and a data field (such as 534) of the sector being read through the channel data interface (such as 303). The second state machine (such as 304) detects the sync mark field (such as 532) of the sector being read through the channel data interface (such as 303).

The active operational state of the second state machine (such as 304) may be a sync detect state (such as 546) associated with the second state machine (such as 304). While in the sync detect state (such as 546), the second state machine (such as 304) awaits detection of a sync mark (such as 532) of the file being read through a channel interface (such as 303). The active operational state of the first state machine (such as 302) may be a sync detect state (such as 540) associated with the first state machine (such as 302). While in the sync detect state (such as 540), the first state machine (such as 302) awaits detection of the sync mark (such as 532) of the file being read through the channel interface (such as 303). The first state machine (such as 302) enters the associated sync detect state (such as 540) following detection that the second state machine (such as 304) has entered the sync detect state (such as 546) associated with the second state machine (such as 304). The active operational state of the first state machine (such as 302) may be a read state (such as 542) enabling the transfer of data through the channel interface (such as 303). The first state machine (such as 302) enters the read state (such as 542) following detection of the sync mark (such as 532) by the first state machine (such as 302) in the associated sync detect state (such as 540). The first state machine (such as 302) enters the inactive operational state (such as 537) following the read state (such as 542) associated with the last sector of the file being read through the channel interface (such as 303). The second state machine (such as 304) goes into the inactive operational state (such as 543) following detection that the first state machine (such as 302) has entered the inactive operational state (such as 537).

The present invention may also be viewed as a state machine (such as 302) for controlling data transfer operations of a formatter (such as 154) between a read/write channel (such as 146) and a buffer (such as 164) of a disc drive (such as 100). The state machine (such as 154) includes an idle state (such as 537). While in the idle state (such as 537), the state machine (such as 302) awaits reception of a read command to a microprocessor interface (such as 310) of the disc sequencer (such as 154). The read command identifies a file to be read through the read/write channel (such as 146). The idle state (such as 537) concludes upon receipt of the read command. The state machine (such as 302) also includes a standby state (such as 538). While in the standby state (such as 538), the state machine (such as 302) awaits a change in an operational state of a parallel state machine (such as 304) based upon detection of a sector pulse associated with a sector of the file to be read through the read/write channel (such as 146). The standby state (such as 538) is initiated upon receipt of the read command and concludes upon the change in the operational state of the parallel state machine (such as 304). The state machine (such as 302) also includes a sync detect state (such as 540). While in the sync detect state (such as 540), the state machine (such as 302) awaits detection of a sync mark (such as 532) of the sector being read through a channel interface (such as 303), which is coupled to the read/write channel (such as 146). The sync detect state (such as 540) is initiated upon detection of the sector pulse by the second state machine (such as 304) and concluded upon detection of the sync mark (such as 532). The state machine (such as 302) also includes a read state (such as 542). While in the read state (such as 542), the state machine (such as 302) awaits detection of a trailing edge (such as 535) of a data field (such as 534) of the sector being read through the channel interface (such as 303). The read state (such as 542) is initiated upon detection of the sync mark (such as 532) and concluded upon detection of the trailing edge of the data field (such as 535). Data are transferred to the buffer (such as 164) from the read/write channel (such as 146) during the read state (such as 542).

The state machine (such as 302) includes a connection (such as 317) to a sector counter (such as 318). The sector counter counts each sector read through the channel interface (such as 303). The idle state (such as 537) is initiated upon the conclusion of the read state (such as 542) once each sector of the file is read through the channel interface (such as 303) as communicated to the state machine (such as 302) through the connection (such as 317) to the sector counter (such as 318). The parallel state machine (such as 304) is initialized to an idle state (such as 543) upon detection by the parallel state machine (such as 304) that the state machine (such as 302) has been initialized to the idle state (such as 543). The state machine (such as 302) is reinitialized to the standby state (such as 538) upon the conclusion of the read state (such as 542) if each sector of the file has not been read through the channel interface (such as 303) as communicated to the state machine (such as 302) through the connection (such as 317) to the sector counter (such as 318). A first file to be read through the read/write channel (such as 146) may be associated with a pipelined read mode and a second file to be read through the read/write channel (such as 146) may be associated with a non-pipelined read mode.

It will be clear that the present invention is well adapted to attain the ends and advantages mentioned, as well as those inherent therein. While a presently preferred embodiment has been described for purposes of this disclosure, various changes and modifications may be made which are well within the scope of the present invention. Changes may be made which will readily suggest themselves to those skilled in the art and which are encompassed in the spirit of the invention disclosed and as defined in the appended claims.

What is claimed is:

1. A disc sequencer for controlling data transfer operations of a read/write channel transferring channel data between a transducer and a buffer of a disc drive, the disc sequencer comprising:

a first state machine having at least one active operational state and at least one inactive operational state; and a second state machine having at least one active operational state and at least one inactive operational state, the second state machine coupled to the first state machine such that an operational state of the first state machine is determined based on a simultaneous operational state of the second state machine, wherein the data transfer is enabled between the read/write channel and the buffer if one of the operational states of the first state machine and the second state machine is active.

2. A disc sequencer as defined in claim 1 wherein the operational state of the second state machine goes active upon detection of a sector pulse identifying a particular sector to be read.

3. A disc sequencer as defined in claim 1 further comprising:
   a channel data interface operably connected to the first state machine and to the second state machine, wherein the first state machine detects a sync mark field and a data field of the sector being read through the channel data interface and the second state machine detects the sync mark field of the sector being read through the channel data interface.

4. A disc sequencer as defined in claim 3 wherein the operational state of the second state machine goes inactive upon detection of the sync mark field.

5. A disc sequencer as defined in claim 4 wherein the operational state of the first state machine goes active one clock period following receipt of a communication that the operational state of the second state machine is active.

6. A disc sequencer as defined in claim 5 wherein the operational state of the first state machine remains active until a trailing edge of the data field.

7. A disc sequencer as defined in claim 1 wherein the active operational state of the second state machine is a sync detect state associated with the second state machine awaiting detection of a sync mark of the file being read through a channel interface.

8. A disc sequencer as defined in claim 7 wherein the active operational state of the first state machine is a sync detect state associated with the first state machine awaiting detection of the sync mark of the file being read through the channel interface, the first state machine entering the associated sync detect state following detection that the second state machine has entered the sync detect state associated with the second state machine.

9. A disc sequencer as defined in claim 8 wherein the active operational state of the first state machine is a read state enabling the transfer of data through the channel interface, the first state machine entering the read state following detection of the sync mark by the first state machine in the associated sync detect state.

10. A disc sequencer as defined in claim 9 wherein an inactive operational state of the first state machine is an idle state, the first state machine entering the idle state following the read state associated with the last sector of the file being read through the channel interface.

11. A disc sequencer as defined in claim 10 wherein an inactive operational state of the first state machine is an idle state, the second state machine entering the idle state following detection that the first state machine has entered the idle state.

12. A state machine for controlling data transfer operations of a formatter between a read/write channel and a buffer of a disc drive, the state machine comprising:
   an idle state awaiting reception of a read command to a microprocessor interface of the formatter, the read command identifying a file to be read through the read/write channel, the idle state concluding upon receipt of the read command;
   a standby state awaiting a change in an operational state of a parallel state machine based upon detection of a sector pulse associated with a sector of the file to be read through the read/write channel, the standby state initiating upon receipt of the read command and concluding upon the change in the operational state of the parallel state machine;
   a sync detect state awaiting detection of a sync mark of the sector being read through a channel interface coupled to the read/write channel, the sync detect state initiating upon detection of the sector pulse by the parallel state machine and concluding upon detection of the sync mark; and
   a read state awaiting detection of a trailing edge of a data field of the sector being read through the channel interface, the read state initiating upon detection of the sync mark and concluding upon detection of the trailing edge, wherein data are transferred to the buffer from the read/write channel during the read state.

13. A state machine as defined in claim 12 further comprising:
   a connection to a sector counter counting each sector read through the channel interface.

14. A state machine as defined in claim 13 wherein the idle state is initiated upon the conclusion of the read state once each sector of the file is read through the channel interface as communicated to the state machine through the connection to the sector counter.

15. A state machine as defined in claim 14 wherein the parallel state machine is initialized to an idle state upon detection by the parallel state machine that the state machine has been initialized to the idle state.

16. A state machine as defined in claim 13 wherein the state machine is re-initialized to the standby state upon the conclusion of the read state if each sector of the file has not been read through the channel interface as communicated to the state machine through the connection to the sector counter.

17. A state machine as defined in claim 12 wherein a first file to be read through the read/write channel is associated with a pipelined read mode and a second file to be read through the read/write channel is associated with a non-pipelined read mode.

18. A disc sequencer for controlling data transfer operations between a read/write channel and a buffer of a disc drive, the disc sequencer comprising:
   a state machine having active operational states and inactive operational states, wherein data are transferred between the read/write channel and the buffer when the state machine is in an active operational state; and
   means for controlling the operational state of the state machine, wherein the operational state goes active upon reception by the controlling means of a sector pulse identifying a sector of a file to be read through the disc sequencer.

19. A disc sequencer as defined in claim 18 wherein the controlling means comprises means for detecting a sync mark of the sector associated with the sector pulse, wherein detection of the sync mark sets the controlling means to an operational state for detecting a subsequent sector pulse of the file.

20. A disc sequencer as defined in claim 19 wherein the state machine comprises a means for detecting a sync mark of the sector associated with the sector pulse, wherein detection of the sync mark by the state machine sets the state machine to an operational state for reading a data field of the sector.

* * * * *

UNITED STATES PATENT AND TRADEMARK OFFICE
CERTIFICATE OF CORRECTION

PATENT NO. : 6,693,753 B2 Page 1 of 1
DATED : February 17, 2004
INVENTOR(S) : Su et al.

It is certified that error appears in the above-identified patent and that said Letters Patent is hereby corrected as shown below:

<u>Title page,</u>
Item [*] Notice, delete the phrase "by 131 days" and insert -- by 251 days --

Signed and Sealed this

Twenty-second Day of February, 2005

JON W. DUDAS
*Director of the United States Patent and Trademark Office*